US007680459B2

(12) United States Patent
Fältman et al.

(10) Patent No.: US 7,680,459 B2
(45) Date of Patent: Mar. 16, 2010

(54) FM TRANSMISSION SYSTEM AND METHOD

(75) Inventors: Irina Fältman, Lund (SE); Bengt Stefan Gustavsson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 659 days.

(21) Appl. No.: 11/609,954

(22) Filed: Dec. 13, 2006

(65) Prior Publication Data

US 2008/0146159 A1 Jun. 19, 2008

(51) Int. Cl.
*H04B 1/00* (2006.01)

(52) U.S. Cl. .................. 455/63.3; 455/63.1; 455/67.11; 455/570; 455/63.4; 375/240.27; 375/340

(58) Field of Classification Search ................ 455/63.3, 455/63.1, 67.11, 570, 63.4, 67.14, 114.2, 455/135, 226.3; 375/240.27, 340, 375
See application file for complete search history.

(56) References Cited

U.S. PATENT DOCUMENTS 5,355,522 A * 10/1994 Demange ..................... 455/62
5,732,073 A * 3/1998 Kusaki et al. ............... 370/280
5,963,865 A * 10/1999 Desgagne et al. ........... 455/450
6,330,450 B1 * 12/2001 Wallstedt et al. ............ 455/447
6,571,089 B1 * 5/2003 Richards et al. ............. 455/266
6,718,166 B2 * 4/2004 Cordone et al. ............. 455/306
7,158,759 B2 * 1/2007 Hansen et al. ........... 455/67.11
7,181,213 B2 * 2/2007 Su et al. ...................... 455/434
7,317,698 B2 * 1/2008 Jagger et al. ................ 370/328
7,379,724 B2 * 5/2008 Nilsson et al. .............. 455/296
7,395,064 B2 * 7/2008 Demirhan et al. ........... 455/434
7,512,379 B2 * 3/2009 Nguyen ..................... 455/41.2
7,519,385 B2 * 4/2009 Nguyen ...................... 455/522
7,574,176 B2 * 8/2009 Kushalnagar et al. ...... 455/63.3
2003/0236075 A1 12/2003 Johnson et al.
2006/0092881 A1 * 5/2006 Laroia et al. ................ 370/331
2006/0094369 A1 * 5/2006 Nguyen ................... 455/67.13
2006/0094371 A1 * 5/2006 Nguyen ................... 455/67.13

(Continued)

FOREIGN PATENT DOCUMENTS

WO 00/21204 4/2000

OTHER PUBLICATIONS

International Preliminary Report on Patentability for corresponding application No. PCT/IB2007/001545 dated Mar. 27, 2009.

*Primary Examiner*—Minh D Dao
(74) *Attorney, Agent, or Firm*—Renner, Otto, Boisselle & Sklar, LLP

(57) ABSTRACT

An RF transmission system comprises an RF transmitter receiving a base band media signal and generating a broadcast signal on a broadcast frequency. The broadcast frequency may be one of a plurality of transmission frequencies within a frequency band. A radio data control module periodically performs an interference detection measurement to determine whether an interfering signal from a remote transmitter exists at the broadcast frequency. An open frequency is selected if an interfering signal from a remote transmitter exists at the broadcast frequency. The open frequency may be one of the plurality of transmission frequencies wherein RF interference is within predetermined acceptance criteria. The RF transmission system transmits an identification of the open frequency on the broadcast frequency and, following such transmission, switches the broadcast frequency to such open frequency.

23 Claims, 2 Drawing Sheets

U.S. PATENT DOCUMENTS

| | | | | |
|---|---|---|---|---|
| 2006/0135063 | A1* | 6/2006 | Katz | 455/25 |
| 2006/0223467 | A1 | 10/2006 | Mason | |
| 2007/0021140 | A1* | 1/2007 | Keyes et al. | 455/522 |
| 2007/0104164 | A1* | 5/2007 | Laroia et al. | 370/338 |
| 2007/0232235 | A1* | 10/2007 | Li et al. | 455/63.1 |
| 2008/0160916 | A1* | 7/2008 | Jagger et al. | 455/63.1 |
| 2008/0220786 | A1* | 9/2008 | Beacham | 455/450 |

* cited by examiner

FM TRANSMISSION SYSTEM AND METHOD

TECHNICAL FIELD OF THE INVENTION

The present invention relates to FM transmission system and, in particular, to an FM transmission system which maintains its media transmission on an open frequency without user intervention.

DESCRIPTION OF THE RELATED ART

A radio data system standard has been developed for the transmission of data in conjunction with an FM broadcast. In more detail, digital data is QPSK modulated to generate a 57 kHz sub carrier. The sub carrier is then mixed with the base band media signal such that the base band media signal comprises the traditional FM components (mono audio signal, stereo difference signal, and pilot tone) plus the 57 kHz sub carrier. Such base band media signal is then "mixed up" to carrier frequency for modulation of the broadcast signal.

Standard encoding commands and data fields of the Radio Data System (RDS) standard are used for transmitting radio station call letters, music type identifier, etc to an FM radio. An FM radio which is also capable of implementing RDS may receive and display such data to the user.

An additional feature of the radio data system is the Alternate Frequency command. A broadcasting station may use the Alternate Frequency command to identify a list of other frequencies that the station uses in adjacent transmitter areas. A RDS enabled radio will re-tune itself to a one of the listed frequencies when the signal degrades.

In a separate field of art, FM transmission systems are a common technology for enabling a user to output audio from a portable device through any FM radio system. I more detail, such an FM transmission system may be coupled to the portable device, receive audio media output from the portable device, and transmit the audio media as an FM stereo signal on an unused frequency for reception by the FM radio system. A common application for such FM transmission systems is output of audio data from a portable device (such as an ipod or mobile telephone) through an automobile's stereo system because few automobiles include an auxiliary input port for the automobiles stereo system.

Some FM transmission systems broadcast on only a single frequency known to be unused by FM radio stations. In more sophisticated FM transmission systems the user may select the transmission frequency. In more detail, the user may utilize the automobile's stereo system to select an unused frequency by sequentially tuning the FM radio to each of multiple frequencies within the band and listing for the frequency that yields a minimum signal. The user would the manually tune the car radio and the FM transmitter to such unused frequency.

A problem exists in that a frequency that may be an unused frequency in one geographic area may be a frequency used by a radio station in another geographic area. Therefore, as the automobile moves, interference from remote broadcasting systems will degrade the signal between the FM transmitter and the automobile's radio.

What is needed is a system and method for implementing an FM transmission system which does not suffer the disadvantages of the above described systems. In more detail what is needed is a system and method for implementing an FM transmission system which maintains its broadcast on a clear (e.g. unused) frequency in an environment wherein channel usage across the spectrum is subject to change.

SUMMARY

A first aspect of the present invention comprises an RF transmission system comprising an RF transmitter receiving a base band media signal and generating a broadcast signal on a broadcast frequency. The broadcast frequency may be a one of a plurality of transmission frequencies within a frequency band.

A radio data control module: i) periodically performs an interference detection measurement to determine whether an interfering signal at the broadcast frequency exceeds threshold criteria, ii) selects an open frequency if an interfering signal from a remote transmitter exists at the broadcast frequency, and iii) drives the RF transmitter to transmit an identification of the open frequency on the broadcast frequency and, following such transmission, to switch the broadcast frequency to such open frequency. The open frequency may be one of the plurality of transmission frequencies wherein RF interference is within predetermined acceptance criteria such as having ambient energy below a predetermined threshold.

The radio data control module may drive the RF transmitter to transmit an identification of the open frequency on the broadcast frequency by mixing, onto the base band media signal, a digital indication of an alternate frequency command and a digital indication of the open frequency. In more detail, the alternate frequency command may be the Radio Data System Alternate Frequency command which, in accordance with the Radio Data System standard, is mixed onto the base band media signal using a 57 kHz sub carrier.

In one sub embodiment, the interference detection measurement may comprise a measurement of RF signal strength at the broadcast frequency during an increment of time during which the RF transmitter discontinues transmission. The increment of time during which the RF transmitter discontinues transmission may be one of a plurality of periodic increments on the order of 50 ms or may be during a time increment when the signal meets predetermined null criteria (such as white noise between songs).

In another sub embodiment, the interference detection measurement may comprise receiving an RF signal at the broadcast frequency and the presence of an interfering signal may be determined by determining a difference between the received RF signal and the broadcast signal of the RF transmitter.

The radio data control module may perform the interference detection by driving operation of an RF receiver. In more detail, the RF receiver may receive a tuning frequency identification signal from the radio data control module. The tuning frequency identification signal indicates an identified frequency. The identified frequency may be one of the frequencies within the frequency band. The RF receiver receives the RF signal at the identified frequency and provides an indication of the received signal to the radio data control module.

In one aspect, the indication of the received signal may be an indication of RF signal strength and/or ambient energy at the broadcast frequency. In another aspect, the indication of the received signal may be the RF signal or a recovered base band signal.

Selecting an open frequency comprises determining RF interference at each of a plurality of transmission frequencies within the frequency band by providing a sequence of frequency identification signals to the RF receiver; and performing an interference detection measurement at each of such frequencies. The acceptance criteria may be criteria for determining the frequency with the lowest strength receive signal.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

Figure 1:
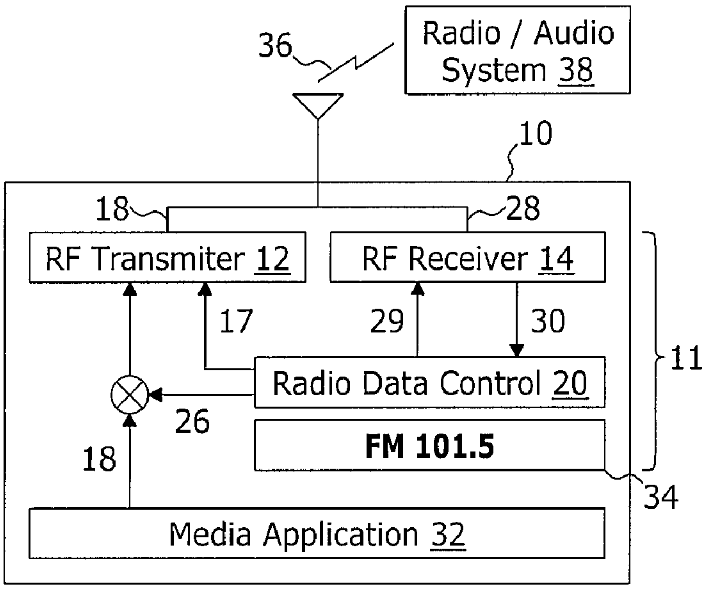
FIG. 1 is a diagram representing an exemplary portable device which may includes an RF transmission system in accordance with one embodiment of the present invention.

The term "electronic equipment" as referred to herein includes portable radio communication equipment. The term "portable radio communication equipment", also referred to herein as a "mobile radio terminal" or "portable device", includes all equipment such as mobile phones, pagers, communicators, e.g., electronic organizers, personal digital assistants (PDAs), smart phones or the like.

Many of the elements discussed in this specification, whether referred to as a "system" a "module" a "circuit" or similar, may be implemented in hardware circuit(s), a processor executing software code, or a combination of a hardware circuit and a processor executing code. As such, the term circuit as used throughout this specification is intended to encompass a hardware circuit (whether discrete elements or an integrated circuit block), a processor executing code, or a combination of a hardware circuit and a processor executing code, or other combinations of the above known to those skilled in the art.

In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

With reference to FIG. 1, an exemplary portable device 10 comprises an RF transmission system 11 coupled to a media application 32.

In the exemplary embodiment, the media application 32 may be any combination of hardware, firmware, and software which generates audio media. Examples include: i) an MP3 player which generates audio media representative of stored audio media; and i) a telephone application which generates audio media representative of a telephone conversation.

The RF transmission system 11 receives a media signal 18 from the media application 32 and broadcasts a carrier signal 36 representing the media signal 18 at a broadcast frequency. A radio a radio/audio system 38, such as an automobile's traditional stereo system or a home FM radio/audio system, is tuned to the broadcast frequency, receives the carrier signal, and outputs the audio media through its speakers.

It is recognized that the clearest reception at the FM radio/audio system 38 is obtained when the broadcast frequency is a clear channel meaning that there is minimal interference from other remote broadcasting systems.

To maintain the broadcast frequency on a clear channel, the RF transmission system 11 periodically performs an interference detection measurement to determine whether an interfering signal at the broadcast frequency exceeds a threshold criteria. The threshold criteria may be RF signal strength and/or ambient RF energy exceeding a predetermined criteria.

If an interfering signal exceeds the threshold criteria, the RF transmission system 11: i) determines interference at each of a plurality of alternate frequencies within the FM frequency band; ii) selects an open frequency, the open frequency being a one of the plurality of alternate frequencies wherein interference is within predetermined acceptance criteria; iii) broadcasts an indication of the open frequency on the then current broadcast frequency; and iv) transitions the broadcast frequency from the then current broadcast frequency to the open frequency such that the open frequency become the new broadcast frequency.

The broadcast of an indication of the open frequency on the then current broadcast frequency may be by way of generating a sub carrier (at 57 kHz) which includes a Radio Data System (RDS) standard Alternate Frequency Command and a digital indication of the open frequency for mixing with the base band media signal 18. As such, the RDS Alternate Frequency Command and the digital indication of the open frequency are, in accordance with the RDS standard, "mixed-up" to the carrier frequency for broadcast in conjunction with the media. After the Alternate Frequency Command is broadcast, the RF transmission system 11 transitions the broadcast frequency to the open frequency.

After the RF transmission system 11 transitions to the broadcast frequency (the original broadcast frequency) to the open frequency (as the new broadcast frequency), the radio/audio system 38 will detects that the signal is no longer available on the original broadcast frequency and will retune to the new broadcast frequency.

To implement such functionality, the RF transmission system may comprise an RF transmitter 12, an RF receiver 14, and a radio data control module 20. In general, the RF transmitter 12 broadcasts the carrier signal 36 representing the media signal 18 at the broadcast frequency. To maintain the broadcast frequency 17 on a clear channel, the radio data control module 20 periodically performs an interference detection measurement to determine whether an interfering signal at the broadcast frequency exceeds the threshold criteria.

Figure 4:
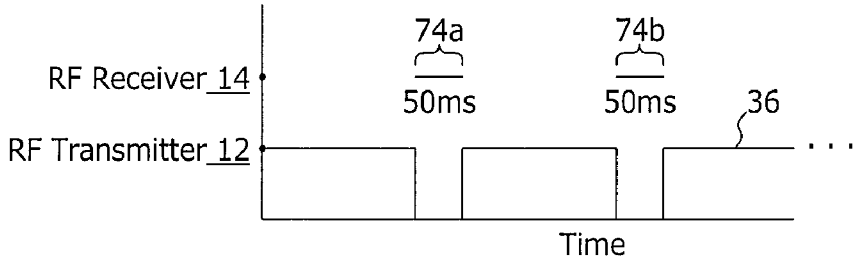
FIG. 4 is a graph representing an exemplary embodiment of determining a clear channel in accordance with one embodiment of the present invention.

In more detail, the radio data control module 20 may provide an indication of a tuning frequency 29 to the RF receiver 14. The RF receiver 14 tunes to the indicated tuning frequency 29 for purposes of measuring broadcast signal strength and/or ambient RF energy as a measurement of interference. Turning briefly to FIG. 4, measurement of broadcast signal strength and/or ambient RF energy at the broadcast frequency may be performed during periodic intervals 74*a*, 74*b* (on the order of 50 ms) when the RF transmitter 12 discontinues the broadcast signal 36.

If the RF energy exceeds a predetermined threshold, interference beyond an acceptable threshold is concluded to exist. The measurement of broadcast signal strength and/or ambient RF energy may be performed by the RF receiver 14 and an indication thereof is provided to the radio data control module which determines whether the such measurement of interference exceeds the predetermined threshold.

Figure 5:
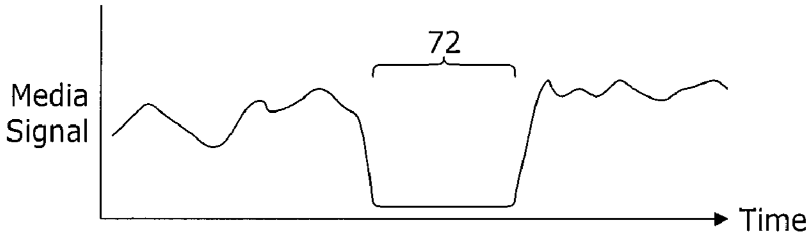
FIG. 5 is a graph representing an alternative embodiment of determining a clear channel in accordance with one embodiment of the present invention.

As an alternative to discontinuing the broadcast signal at periodic intervals 74*a*, 74*b*, with reference to FIG. 5, discontinuation of the broadcast signal (and measurement of RF energy at the broadcast frequency) may be performed during an increment of time during which the media signal 18 (FIG. 1) is null 72 (e.g. is below a null threshold such as being the white noise signal between songs or other pauses in useful media). Again, the measurement of broadcast signal strength and/or ambient RF energy may be performed by the RF receiver 14 and an indication thereof is provided to the radio data control module which determines whether the such measurement of interference exceeds the predetermined threshold.

To determine whether the media signal 18 is null, the radio data control module 20 may monitor the media signal 18 or may monitor the broadcast signal 36 via the RF receiver 14 and, when the media signal is null, signal the RF transmitter 12 to discontinue transmission of the broadcast signal for an interval of time for performance of the interference detection measurement.

Figure 6:
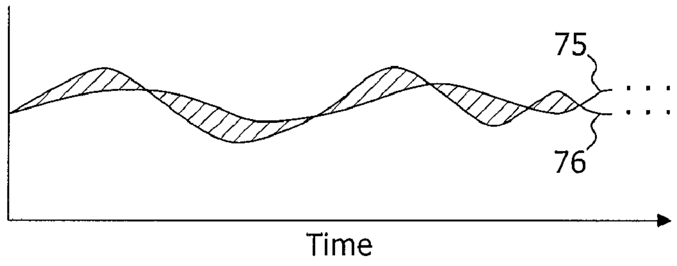
FIG. 6 is a graph representing an exemplary embodiment for determining interference on a broadcast frequency in accordance with one embodiment of the present invention.

Referring to FIG. 6, an alternative system for determining whether interference exists at the broadcast frequency is represented. A comparison between a received signal 75 (at the broadcast frequency) with the known broadcast signal 76 (a signal known to have been broadcast by the RF transmitter 12) is performed. When the discrepancy between the signals (represented by the shaded area) exceeds a predetermined threshold, interference beyond an acceptable threshold is concluded to exists.

Returning to FIG. 1, if interference beyond an acceptable threshold of interference is detected, the radio data control module 20: i) determines interference at each of a plurality of alternate frequencies within the frequency band; ii) selects an open frequency, the open frequency being a one of the plurality of alternate frequencies wherein interference is within predetermined acceptance criteria; iii) provides the Alternate Frequency command on a sub carrier 27 for mixing with the media signal 18 for driving the RF transmitter 12 to broadcast an indication of the open frequency on the then current broadcast frequency; and iv) provides an indication of the open frequency 17 to the RF transmitter 12 to transition the broadcast frequency from the then current broadcast frequency to the open frequency such that the open frequency become the new broadcast frequency.

Figure 2:
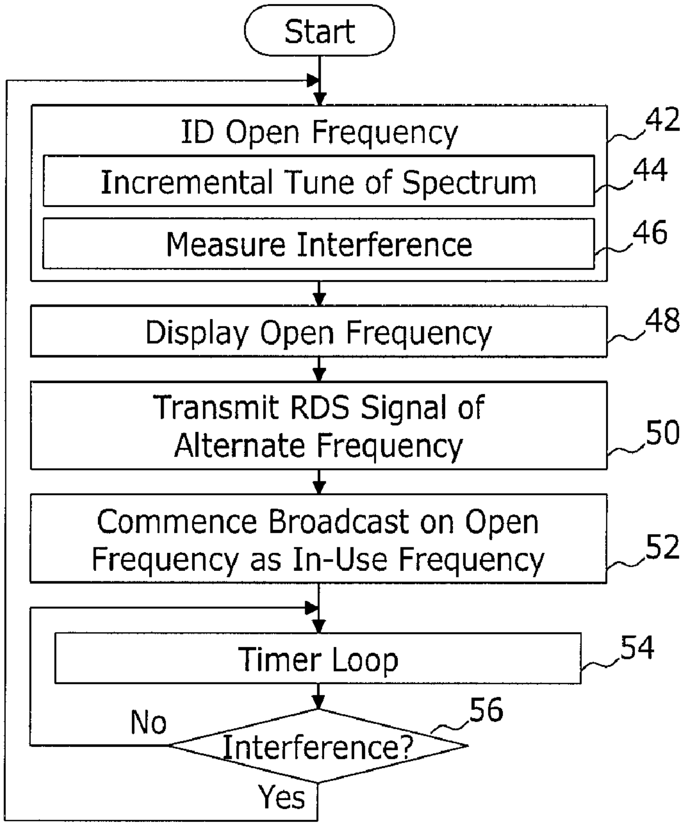
FIG. 2 is a flow chart representing exemplary operation of an RF transmission system in accordance with one embodiment of the present invention.

Turning to FIG. 2 a flow chart representing exemplary operation of the radio data control module 20 is shown. Referring to FIG. 2 in conjunction with FIG. 1, step 42 represents identifying an open frequency. An exemplary process for identifying an open frequency includes incrementing the indication of the tuning frequency 29 provided to the RF receiver 14 to each of a plurality of frequencies within the FM band (step 44) and, for each of such plurality of frequencies, determining whether interference is within predetermined acceptance criteria (step 46). The identified open frequency may be one of the plurality of frequencies where the interference is within the predetermined acceptance criteria.

Figure 3:
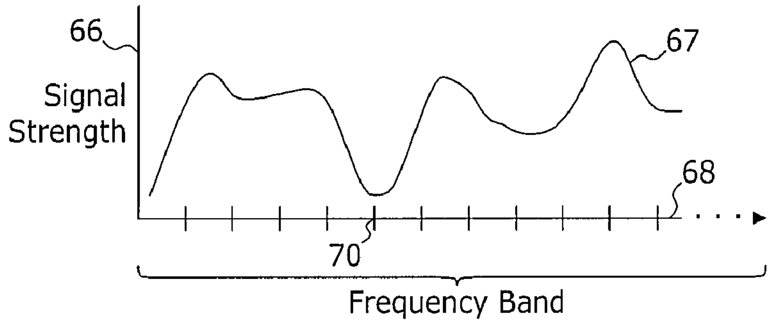
FIG. 3 is a graph representing an exemplary embodiment of determining interference on a frequency within a frequency band in accordance with one embodiment of the present invention.

Referring briefly to FIG. 3, a graph representing an exemplary method for determining whether interference 67, at each of a plurality of frequencies 68, is within acceptable criteria. The horizontal axis represents the plurality of frequencies 68 within the FM band. The vertical axis represents signal strength or ambient energy at the frequency. The open frequency 70 may be selected by determining the frequency within the frequency band with the weakest interfering signal 67 which may be lowest signal strength or lowest ambient energy. Again, to enable measurement of interference without distortion from energy of the RF transmitter 12, the measurement of interference may be obtained during periodic intervals 74*a*, 74*b* when the broadcast signal is discontinued as discussed with respect to FIG. 4.

Returning to FIG. 2 in conjunction with FIG. 1, step 48 represents displaying an indication of the open frequency on a display 34. It should be appreciated that upon initial start up of the system, the radio/audio system 38 may not be tuned to the broadcast frequency 17. As such, displaying the indication of the open frequency on the display 34 enables the user to initially tune the radio/audio system 38 to the open frequency.

Step 50 represents generating the RDS signal 26 (including the Alternate Frequency command and a digital indication of the open frequency) for mixing with the base band media signal 18 for on the then in use broadcast frequency.

Step 52 represents providing the indication of the open frequency 17 to the RF transmitter 12 to transition the broadcast frequency from the then current broadcast frequency to the open frequency such that the open frequency become the new broadcast frequency.

As discussed, the radio data control module 20 periodically measures interference at the broadcast frequency to determine whether an interfering signal from a remote transmitter exists at the broadcast frequency. Step 54 represents a time loop to effect such periodic measurement and decision box 56 represents determining whether an interfering signal exceeds acceptable criteria. If an interfering signal exceed acceptable criteria, steps 42 though 52 are repeated to transition the broadcast to an open frequency.

It should be appreciated that the systems and methods of the present invention provide a convenient system for selecting amongst multiple services that may be provided by a remote service provider system and selection amongst multiple transport options for initiating use of the selected service.

Although the invention has been shown and described with respect to certain preferred embodiments, it is obvious that equivalents and modifications will occur to others skilled in the art upon the reading and understanding of the specification. For example, FIG. 1 represents the RF transmission system 11 as an integrated component of the portable device 10. Alternatively, it is envisioned that the RF transmission system 11 may be implemented in a module which couples to the portable device via an external port or a wireless connection such as Bluetooth®. Further, the display 34 (for displaying an indication of the broadcast frequency) may also be an integrated component of the portable device or the module of the RF transmission system 11. The present invention includes all such equivalents and modifications, and is limited only by the scope of the following claims.

The invention claimed is:

1. An RF transmission system comprising:

an RF transmitter receiving a base band media signal and generating a broadcast signal on a broadcast frequency, the broadcast frequency being a one of a plurality of transmission frequencies within a frequency band;

a radio data control module:

periodically performing an interference detection measurement to determine whether an interfering signal at the broadcast frequency exceeds a threshold criteria, and selecting an open frequency if an interfering signal at the broadcast frequency exceeds the threshold criteria, the open frequency being one of the plurality of transmission frequencies wherein RF interference is within predetermined acceptance criteria; and driving the RF transmitter to transmit an identification of the open frequency on the broadcast frequency by mixing, onto the base band media signal, a digital indication of an alternate frequency command and a digital indication of the open frequency, and, following such transmission, to switch the broadcast frequency to such open frequency.

2. The RF transmission system of claim 1, wherein the interference detection measurement comprises a measurement of RF signal strength at the broadcast frequency during an increment of time during which the RF transmitter discontinues transmission.

3. The RF transmission system of claim 2, wherein the increment of time occurs when the media signal meets predetermined null criteria.

4. The RF transmission system of claim 1, wherein the interference detection measurement comprises receiving an RF signal at the broadcast frequency and the presence of an interfering signal is determined by determining a difference between the received RF signal and the broadcast signal of the RF transmitter.

5. An RF transmission system comprising:

an RF transmitter receiving a base band media signal and generating a broadcast signal on a broadcast frequency, the broadcast frequency being a one of a plurality of transmission frequencies within a frequency band;

a radio data control module:

periodically performing an interference detection measurement to determine whether an interfering signal at the broadcast frequency exceeds a threshold criteria, and selecting an open frequency if an interfering signal at the broadcast frequency exceeds the threshold criteria, the open frequency being one of the plurality of transmission frequencies wherein RF interference is within predetermined acceptance criteria; and driving the RF transmitter to transmit an identification of the open frequency on the broadcast frequency and, following such transmission, to switch the broadcast frequency to such open frequency; and further comprising an RF receiver:

receiving a tuning frequency identification signal from the radio data control module, the tuning frequency identification signal indicates an identified frequency, the identified frequency being a one of the frequencies within the frequency band;

receiving an RF signal on the identified frequency;

providing an indication of the received RF signal to the radio data control module; and selecting an open frequency comprises determining RF interference at each of a plurality of transmission frequencies within the frequency band by:

providing a sequence of frequency identification signals to the RF receiver;

receiving an indication of the received RF signal at each of the sequence of identified frequencies; and the acceptance criteria is the frequency with the weakest interfering signal.

6. The RF transmission system of claim 5, wherein the radio data control module drives the RF transmitter to transmit an identification of the open frequency on the broadcast frequency by mixing, onto the base band media signal, a digital indication of an alternate frequency command and a digital indication of the open frequency.

7. The RF transmission system of claim 6, wherein the interference detection measurement comprises a measurement of RF signal strength at the broadcast frequency during an increment of time during which the RF transmitter discontinues transmission.

8. The RF transmission system of claim 7, wherein the increment of time occurs when the media signal meets predetermined null criteria.

9. The RF transmission system of claim 6, wherein the interference detection measurement comprises receiving an RF signal at the broadcast frequency and the presence of an interfering signal is determined by determining a difference between the received RF signal and the broadcast signal of the RF transmitter.

10. An RF transmission system comprising:

an RF transmitter receiving a base band media signal and generating a broadcast signal on a broadcast frequency, the broadcast frequency being a one of a plurality of transmission frequency within a frequency band;

a radio data control module:

determining RF interference at each of a plurality of transmission frequencies within the frequency band;

selecting an open frequency, the open frequency being one of the plurality of transmission frequencies wherein RF interference is within predetermined acceptance criteria; and driving the RF transmitter to transmit an identification of the open frequency on the broadcast frequency by mixing, onto the base band media signal, a digital indication of an alternate frequency command and a digital indication of the open frequency, and, following such transmission, to switch the broadcast frequency to such open frequency.

11. The RF transmission system of claim 10, wherein:

the radio data control module:

periodically performs an interference detection measurement to determine whether an interfering signal at the broadcast frequency exceeds a threshold criteria, and selects a second open frequency upon determining that an interfering signal exceeds the threshold criteria, the second open frequency being one of the plurality of transmission frequencies wherein RF interference is within the predetermined acceptance criteria; and drives the RF transmitter to transmit an identification of the second open frequency on the broadcast frequency and, following such transmission, to switch the broadcast frequency to such second open frequency.

12. The RF transmission system of claim 11, wherein the interference detection measurement comprises a measurement of RF signal strength at the broadcast frequency during an increment of time during which the RF transmitter discontinues transmission.

13. The RF transmission system of claim 12, wherein the increment of time occurs when the media signal meets predetermined null criteria.

14. The RF transmission system of claim 11, wherein the interference detection measurement comprises receiving an RF signal at the broadcast frequency and the presence of an interfering signal is determined by detecting a difference between the received RF signal and the broadcast signal of the RF transmitter.

15. A portable device comprising:

a media application generating an audio media signal;

an RF transmitter receiving the audio media signal and generating a broadcast signal on a broadcast frequency, the broadcast frequency being a one of a plurality of transmission frequencies within a frequency band;

a radio data control module:

periodically performing an interference detection measurement to determine whether an interfering signal at the broadcast frequency exceeds a threshold criteria, selecting an open frequency if an interfering signal at the broadcast frequency exceeds the threshold criteria, the open frequency being one of the plurality of transmission frequencies wherein RF interference is within predetermined acceptance criteria; and driving the RF transmitter to transmit an identification of the open frequency on the broadcast frequency by mixing, onto the base band media signal, a digital indication of an alternate frequency command and a digital indication of the open frequency, and, following such transmission, to switch the broadcast frequency to such open frequency.

16. The portable device of claim 15, wherein the interference detection measurement comprises a measurement of RF signal strength at the broadcast frequency during an increment of time during which the RF transmitter discontinues transmission.

17. The portable device of claim 16, wherein the increment of time occurs when the media signal meets predetermined null criteria.

18. The portable device of claim 15, wherein the interference detection measurement comprises receiving an RF signal at the broadcast frequency and the presence of an interfering signal is determined by determining a difference between the received RF signal and the broadcast signal of the RF transmitter.

19. A portable device comprising:

a media application generating an audio media signal;

an RF transmitter receiving the audio media signal and generating a broadcast signal on a broadcast frequency, the broadcast frequency being a one of a plurality of transmission frequencies within a frequency band;

a radio data control module:

periodically performing an interference detection measurement to determine whether an interfering signal at the broadcast frequency exceeds a threshold criteria, selecting an open frequency if an interfering signal at the broadcast frequency exceeds the threshold criteria, the open frequency being one of the plurality of transmission frequencies wherein RF interference is within predetermined acceptance criteria; and driving the RF transmitter to transmit an identification of the open frequency on the broadcast frequency and, following such transmission, to switch the broadcast frequency to such open frequency; and further comprising an RF receiver:

receiving a tuning frequency identification signal from the radio data control module, the tuning frequency identification signal indicates an identified frequency, the identified frequency being a one of the frequencies within the frequency band;

receiving an RF signal on the identified frequency;

providing an indication of the received RF signal to the radio data control module; and selecting an open frequency comprises determining RF interference at each of a plurality of transmission frequencies within the frequency band by:

providing a sequence of frequency identification signals to the RF receiver;

receiving an indication of the received RF signal at each of the sequence of identified frequencies; and the acceptance criteria is the frequency with the weakest interfering signal.

20. The portable device of claim 19, wherein the radio data control module drives the RF transmitter to transmit an identification of the open frequency on the broadcast frequency by mixing, onto the base band media signal, a digital indication of an alternate frequency command and a digital indication of the open frequency.

21. The portable device of claim 20, wherein the interference detection measurement comprises a measurement of RF signal strength at the broadcast frequency during an increment of time during which the RF transmitter discontinues transmission.

22. The portable device of claim 21, wherein the increment of time occurs when the media signal meets predetermined null criteria.

23. The portable device of claim 20, wherein the interference detection measurement comprises receiving an RF signal at the broadcast frequency and the presence of an interfering signal is determined by determining a difference between the received RF signal and the broadcast signal of the RF transmitter.

* * * * *